March 1, 1960
G. A. LYON
2,926,959
WHEEL COVER
Filed June 7, 1956
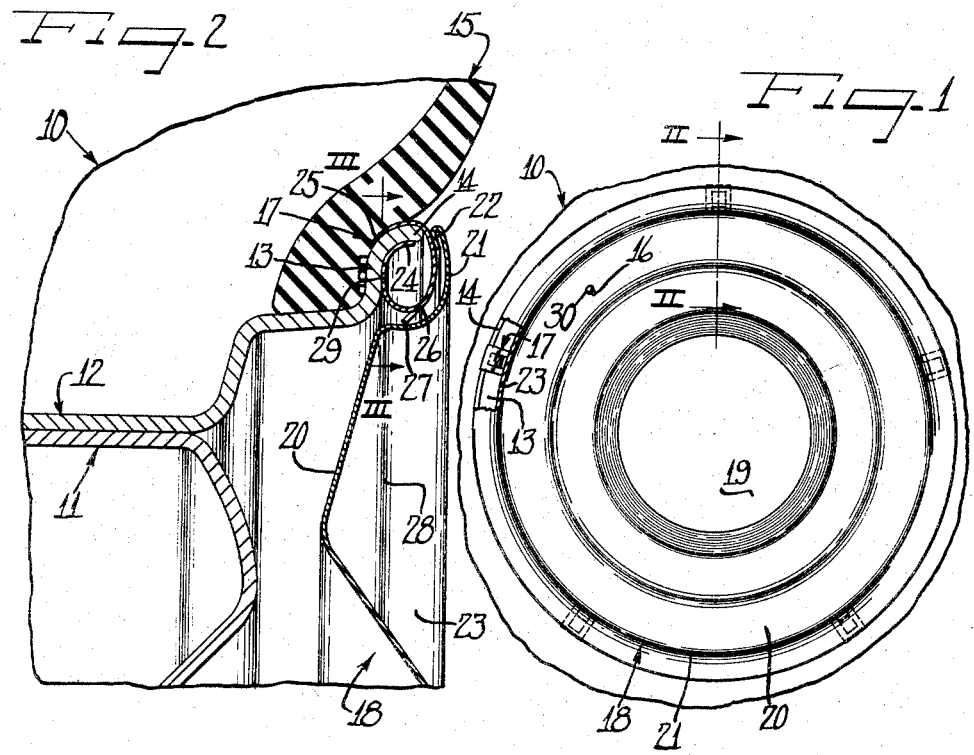
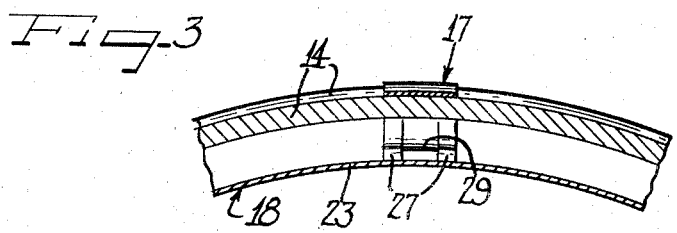
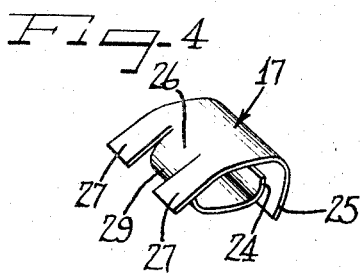
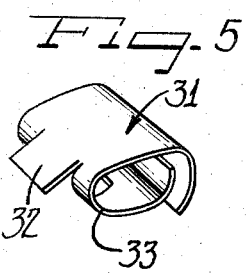
Inventor
George Albert Lyon

United States Patent Office 2,926,959
Patented Mar. 1, 1960

2,926,959

WHEEL COVER

George Albert Lyon, Detroit, Mich.

Application June 7, 1956, Serial No. 589,950

9 Claims. (Cl. 301—37)

This invention relates generally to wheel structures and more particularly to a new and improved highly ornamental wheel cover member for protective retained disposition upon a vehicle wheel.

More specifically, this invention relates to a new and improved manner of maintaining the cover upon the tire rim of the wheel by means of spring clips which are each adapted to be self-retaining upon the terminal rim flange of the tire rim.

Accordingly, an object of this invention is to provide a new and improved wheel structure including a tire rim, a tire assembly, spring clips, and a wheel cover member and which are all adapted to cooperate together in a new and improved manner.

Still another object of this invention is to provide a new and improved highly ornamental wheel cover member for protective retained disposition upon a vehicle wheel.

A still further object of this invention is to provide a new and improved spring clip construction.

A further object of this invention is to provide a new and improved clip and cover construction such that lends itself to economical manufacture on a large production basis and which is adapted to efficiently coact together with a vehicle wheel.

According to the general features of this invention, there is provided in a wheel structure, a wheel including a rim having a radial flange joined to a terminal rim flange with the junction thereof defining an annular seat, circumferentially spaced clips on the rim, the clip comprising a continuous strip with opposite ends being stressed into retaining cooperation with inside and outside surfaces of the terminal rim flange to maintain the clip in assembly therewith, the clip being looped between its ends and in bottomed engagement against the tire rim, resilient finger extensions on the clips, and a wheel cover member overlying the wheel having a cover portion in snap-on, pry-off resilient tensioned engagement with the finger extensions.

Other objects and features of the present invention will be apparent from the following detailed description taken in conjunction with the accompanying sheet of drawings illustrating therein several embodiments and in which:

Figure 1 is a side elevation of my wheel structure;

Figure 2 is an enlarged fragmentary cross-sectional view taken substantially on line II—II of Figure 1 looking in the direction indicated by the arrows;

Figure 3 is an enlarged fragmentary cross-sectional view taken substantially on the line III—III of Figure 2 looking in the direction indicated by the arrows;

Figure 4 is an enlarged perspective view of my novel spring clip as shown in Figures 1–3; and Figure 5 is an enlarged perspective view of a modified clip construction.

As shown on the drawings:

The reference numeral 10 indicates generally my wheel structure which includes suitably connected together body and rim parts 11 and 12. The body part 11 lends itself to being attached to an automobile vehicle and the like by means of inserting lugs on an axle of the vehicle through openings in the body part 11 and threading bolts onto the lugs to clamp the body part and wheel structure onto the wheel in a conventional manner.

The tire rim 12 is more or less of a conventional multi-flanged, drop center type of tire rim and has a generally radially outwardly extending flange 13 terminating in an axially outwardly extending terminal flange 14. Carried upon the tire rim 12 is a tire assembly 15. The tire assembly 15 may be either a pneumatic tire and tube assembly or a tubeless tire assembly and in either case is adapted to be inflated by injecting air through valve stem 16.

Disposed and carried at the radially and axially outer marginal portion of the tire rim 12 and embodying features of my invention are circumferentially spaced spring clips 17. Each of these clips are adapted to develop sufficient gripping capacity as to self-retain themselves upon the tire rim 12. These clips 17 also serve the further function of providing means for retaining a cover member 18 upon the wheel in snap-on, pry-off, detachable engagement therewith. If desired, certain of the clips 17 may be utilized to maintain wheel balancing weights in assembly with the tire rim.

The cover 18 includes a central crown portion 19 and has a dished portion 20 generally opposite the junction of the rim and body parts 11 and 12. Disposed at the radially outer side of the dished portion 20 is an annular margin 21 which terminates in a turned under pry-off bead 22. The margin 21 is connected to the dished portion 20 by annular cover portion 23, the inside surface of which defines an annular shoulder which is adapted to cooperate with the clips 17 in the maintenance of the cover upon the wheel.

The retaining clips 17 may be made from any suitable material such as spring steel and the like. The cover member 18 may also be made from any suitable material such as aluminum, steel and the like.

The clips 17 comprise a deformed strip having opposite ends 24 and 25 disposed in a predetermined relationship relative to one another so as to provide means with which the terminal rim flange 14 may be gripped under resilient tension to maintain the clip in assembly therewith. More particularly it will be appreciated, the ends 24 and 25 comprise legs which are adapted to bear against the inside and outside of the rim flange 14. Normally, the legs 24 and 25 are angled slightly toward each other and are a reduced distance apart as compared to the width of the terminal rim flange 14. Leg 25 is elongated so that when the clip is assembled upon the tire rim 12 the tire 15 is adapted to bear against leg 25 to provide a rigid backup and to further hold the clip under tension against the tire rim.

Between the clip ends 24 and 25 is looped clip portion 26. In the first form of my invention, struck out from the looped portion 26 are two circumferentially spaced, resiliently deflectable finger extensions 27. Each of the extensions 27 extends generally radially and axially inwardly and is adapted to be cammed over annular rib 28 into tensioned engagement with the annular cover portion 23 defining the shoulder with which the extensions 27 cooperate. As is shown in Figure 1, the clips 17 are disposed in a common circle thereby arranging the extensions in a common circle having a diameter slightly smaller than the diameter of the cover portion 23 to permit tensioned engagement between the clips and cover member when the cover member is assembled on the wheel.

Extending beyond the extensions 27 is backup and bottomming portion 29 which terminates in the leg 24. The bottoming portion 29 and leg 24 are adapted to bear against the inside surfaces of the rim flanges 13 and 14 in bottomed engagement therewith. By this construction, the extensions 27 are provided with a rigid backup. Also, as the cover is engaged under tension with the finger extensions 27 a force is exerted such as tends to place the leg 24 under further tension to augment the gripping action of the legs 24 and 25 with the terminal rim flange 14.

The clip 17 may be assembled upon the tire rim and more particularly the terminal rim flange 14 by spreading the legs 24 and 25 apart and slipping them over the arcuate terminal rim flange 14 until the clip portion 29 bottoms against the rim flange 13. Thereafter the cover member 18 may be assembled upon the wheel by initially aligning cover opening 30 with the valve 16 and thereafter upon the application of an axially inward force the cover and, more particularly, the cover portion 23 is urged into resilient tensioned snap-on, pry-off, detachable engagement with the finger extensions 27. To remove the cover from the wheel a suitable pry-off tool may be inserted underneath the bead 22 and upon levering the pry-off tool against the tire rim 12 the cover may be disengaged from the finger extensions 27.

Shown in Figure 5 is a modified form of clip 31. The instant clip 31 differs from clip 17 in that a single struck out finger extension 32 is provided as opposed to the two struck out finger extensions 27 provided in the first form of my invention. The clip 31 also differs from the clip 17 in that the finger extension 32 is positioned generally in the middle of the loop portion 33, whereas in the first form the extensions 27 were positioned on the outer sides of the looped portion 29. The construction of the clip 31 is otherwise the same and is adapted to cooperate with the tire rim 12 and the cover member 18 in much the same manner as does the clip 17.

It will be understood that modifications and variations may be effected without departing from the scope of the novel concepts of the present invention.

I claim as my invention:

1. In a wheel structure, a wheel including a rim having a radial rim flange joined to a terminal rim flange with the junction thereof defining an annular seat, circumferentially spaced clips on the rim, each of said clips comprising a continuous strip with opposite terminal ends being stressed into retaining cooperation with inside and outside surfaces of the terminal rim flange to maintain each of said clips in assembly therewith, each of said clips being looped between its terminal ends and in bottomed engagement against the tire rim, and said clips each having at least one resilient finger extension disposed between the terminal ends of the clips for cooperation with a wheel cover member to maintain the same upon the wheel.

2. In a wheel structure, a wheel including a rim having a radial rim flange joined to a terminal rim flange with the junction thereof defining an annular seat, circumferentially spaced clips on the rim, each of said clips comprising a continuous strip with opposite terminal ends being stressed into retaining cooperation with inside and outside surfaces of the terminal rim flange to maintain each of said clips in assembly therewith, each of said clips being looped between its terminal ends and in bottomed engagement against the tire rim, at least one resilient finger extension on each of said clips, and a wheel cover member overlying the wheel having a cover portion opposing said extensions and slidable axially relative to the extensions with the finger extensions being resiliently deflected radially in tensioned engagement with the cover portion maintaining the cover member in assembly on the wheel.

3. In a wheel structure, a wheel including a rim having a radial rim flange joined to an annular arcuate terminal rim flange with the junction thereof defining an annular seat, circumferentially spaced clips on the rim, each of said clips comprising a continuous strip with opposite terminal ends being stressed into retaining cooperation with inside and outside surfaces of the terminal rim flange to maintain each of said clips in assembly therewith, each of said clips being looped between its terminal ends and in bottomed engagement against the tire rim, at least one resilient finger extension on each of said clips, and a wheel cover overlying the wheel having a cover portion opposing said extensions and slidable axially relative to the extensions with the finger extensions being resiliently deflected radially in tensioned engagement with the cover portion maintaining the cover member in assembly on the wheel, said terminal ends being arcuate in a circumferential and a radial direction in conformity with the configuration of the radially inner and outer surfaces of the terminal rim flange for nested engagement therewith.

4. In a wheel structure, a wheel including a rim having a radial rim flange joined to a terminal rim flange with the junction thereof defining an annular seat, circumferentially spaced clips on the rim, each of said clips comprising a continuous strip with opposite terminal ends being stressed into retaining cooperation with inside and outside surfaces of the terminal rim flange to maintain each of said clips in assembly therewith, each of said clips being looped between its terminal ends and in bottomed engagement against the tire rim, at least one resilient finger extension on each of said clips, and a wheel cover member overlying the wheel having a cover portion in snap-on, pry-off resilient tensioned engagement with said finger extensions, said finger extensions on said clips being struck out and backed up and said clips resisting displacement by means of one of said terminal ends of said looped clip being nestingly bottomed in said annular seat against said rim flange.

5. In a wheel structure, a wheel including a tire rim supporting a tire and having a terminal rim flange, circumferentially spaced spring clips carried on the terminal rim flange, each of said clips comprising a continuous strip with opposite terminal end portions comprising inner and outer legs with said legs being stressed into retaining cooperation with inside and outside surfaces of the terminal rim flange to maintain each of said clips in assembly therewith, said tire being in backed up engagement with said outer leg, at least one finger extension on each of said clips which finger extensions are disposed between the terminal end portions of the clips and are turned radially away from the clips, and a wheel cover member overlying the wheel having a cover portion in tensioned engagement with said finger extensions and with the engagement of said cover portion and finger extensions exerting a force such as cooperates with the tire to augment the tensioned engagement of said inner and outer legs with said terminal rim flange.

6. In a wheel structure, a wheel including a tire rim supporting a tire assembly and having a terminal rim flange, circumferentially spaced spring clips carried on the terminal rim flange, each of said clips comprising a continuous strip and having a clip retaining portion having opposite ends providing inner and outer legs for grasping and self-retaining each of said clips in assembly on said terminal rim flange, at least one finger extension on each of said clips between the ends of the clips, and a wheel cover section overlying the wheel having a dished cover portion provided with a radially and axially inclined surface with said finger extensions being resiliently deflected and cammed along said inclined surface in assembly therewith and with the engagement of said cover portion and finger extensions exerting a force such as cooperates with said legs to augment the engagement of said clip-retaining portion with said terminal rim flange.

7. In a wheel structure including a tire rim having stepped rim flanges joined together including a radial rim flange and an outer terminal rim flange, a series of circumferentially spaced clips each having means for retaining itself upon the terminal rim flange, said clips each having at least one generally radially and axially inwardly extending resiliently deflectable finger extension provided with a terminal edge with said extensions being disposed in a common circle generally axially outwardly of the radial rim flange and radially inwardly of the terminal rim flange, and a dished cover member including a generally radially outwardly facing annular inclined surface having a diameter slightly at variance with the terminal edges which surface is slidable axially relative to said edges in yieldable snap-on, pry-off assembly together.

8. In a wheel structure including a tire rim having an outer terminal rim flange, a series of circumferentially spaced clips each having means for retaining itself upon the terminal rim flange, said clips each having at least one generally radially and axially inwardly extending resiliently deflectable finger extension provided with a terminal edge with said extensions being disposed in a common circle, and a dished cover member including a generally radially outwardly facing annular inclined surface having a diameter slightly at variance with the terminal edges which surface is in yieldable snap-on, pry-off assembly with said extensions, the terminal edges of the extensions being in edgewise retaining engagement with the annular inclined surface on the dished cover each of said clips comprising a continuous strip having opposite terminals of the strip sprung apart and engaged under tension against the inside and the outside surfaces of the terminal rim flange in assembly therewith, each of the extensions being carried on the strip between the opposite terminals of the strip and being disposed on the strip radially inwardly of the opposite terminals so as to be clear of the terminal rim flange and radially engageable with the annular inclined surface of the dished cover member.

9. In a wheel structure including a tire rim having an outer terminal rim flange, a series of circumferentially spaced clips each having means for retaining itself upon the terminal rim flange, said clips each having at least one generally radially and axially inwardly extending resiliently deflectable finger extension provided with a terminal edge with said extensions being disposed in a common circle, and a dished cover member including a generally radially outwardly facing annular inclined surface having a diameter slightly at variance with the terminal edges which surface is in yieldable snap-on, pry-off assembly with said extensions, each of said clips comprising a continuous strip having opposite terminals of the strip sprung apart and engaged under tension against the inside and the outside surfaces of the terminal rim flange in assembly therewith, each of said extensions being struck out of an intermediate portion of each of said clips between said opposite terminals and being urged radially outwardly by said radially outwardly annular inclined surface compressing the terminal edge engaged against the inner surface of the terminal rim flange thereagainst.

References Cited in the file of this patent
UNITED STATES PATENTS

| | | |
|---|---|---|
| 2,351,655 | Aske | June 20, 1944 |
| 2,644,721 | Grimshaw | July 7, 1953 |
| 2,749,184 | Wood | June 5, 1956 |
| 2,749,186 | Wood | June 5, 1956 |